No. 765,209. PATENTED JULY 19, 1904.
N. W. STORER.
METHOD OF OPERATING AND CONTROLLING ELECTRIC MOTORS.
APPLICATION FILED AUG. 15, 1902.
NO MODEL.
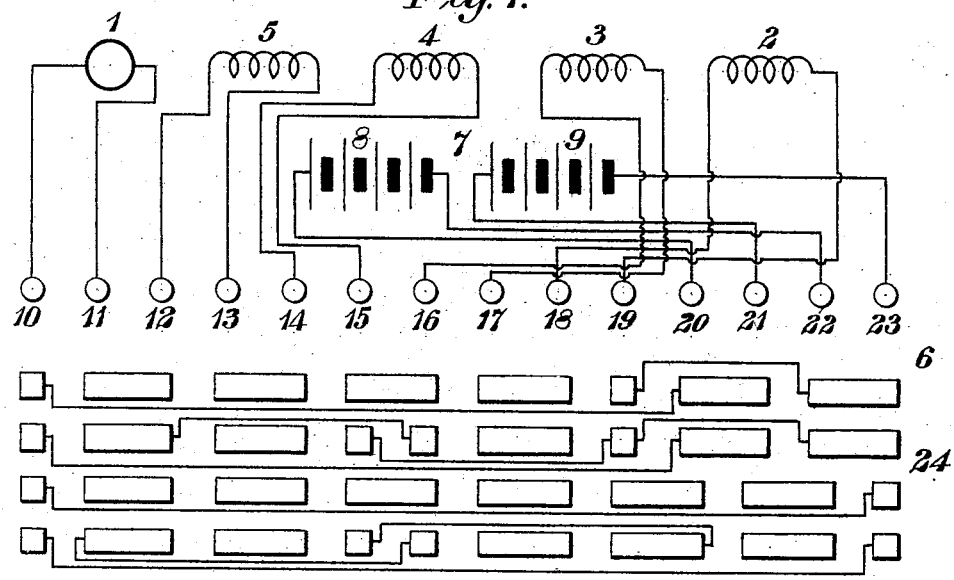
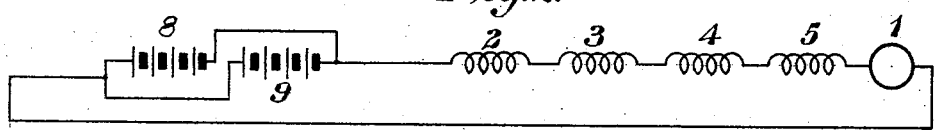
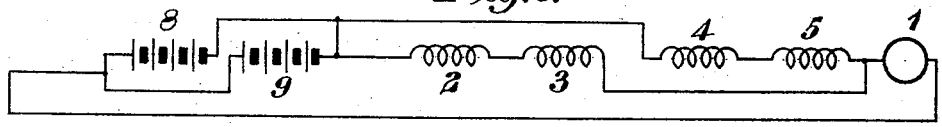
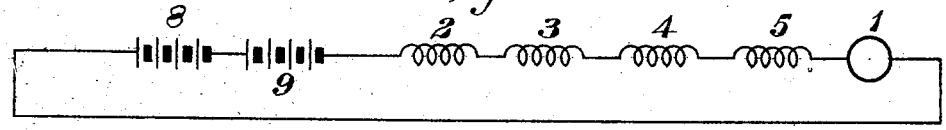
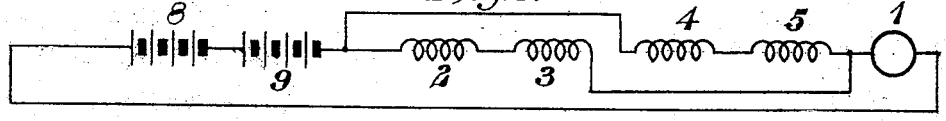
WITNESSES:
C. L. Belcher
B. B. Hines
INVENTOR
Norman W. Storer
BY
Wesley G. Carr
ATTORNEY.

No. 765,209.

Patented July 19, 1904.

UNITED STATES PATENT OFFICE.

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF OPERATING AND CONTROLLING ELECTRIC MOTORS.

SPECIFICATION forming part of Letters Patent No. 765,209, dated July 19, 1904.

Application filed August 15, 1902. Serial No. 119,764. (No model.)

*To all whom it may concern:*

Be it known that I, NORMAN W. STORER, a citizen of the United States, and a resident of Pittsburg, in the county of Allegheny and State of Pennsylvania, have invented a new and useful Improvement in Methods of Operating and Controlling Electric Motors, of which the following is a specification.

My invention relates to the operation of electric motors, and more especially to series-wound motors of the direct-current type.

The object of my invention is to provide a method of motor operation and control which shall insure a maximum torque with a relatively small consumption of current and gradual speed variation with a minimum expenditure of energy.

My invention is primarily designed for utilization in the operation of motors from secondary batteries to drive vehicles, and it will be so described, with the understanding, however, that it is not necessarily restricted to the specific combinations and relations shown and described.

It is of paramount importance in the operation of electric automobiles to obtain a maximum mileage with the least possible weight of battery and a minimum cost of maintenance. It is well known that a high discharge rate not only reduces the output of the battery by decreasing the ampere-hour capacity and lowering the voltage of discharge, but it injures the plates of the battery, and therefore increases the cost of maintenance.

My invention provides for keeping the maximum discharge rate of the battery relatively low by so designing the motor that the field-magnet is worked far below the saturation-point under all normal loads. If the field were entirely unsaturated throughout the maximum range of load, the torque would increase as the square of the current, while if the field were saturated throughout the entire range of load the torque would increase in direct proportion to the current. Therefore, in the one case in order to obtain four times full-load torque it would be necessary to have twice full-load current, while in the other case it would be necessary to have four times full-load current. Both of these cases are extreme. The motor which I propose to use is not absolutely unsaturated and requires about 2.3 times full-load current to give four times full-load torque, while the ordinary motor which is worked near saturation at full load will require from three to three and one-half times full-load current to give four times full-load torque. The difference between these figures will make a very material difference in the ampere-hour capacity and the mileage of a battery when run over a given route.

In order to secure the greatest advantage from under saturation of the field magnetic circuit, I have designed a motor to be operated with the field-coils all in series at the first notch and with the two halves in multiple on the second notch of the controller. This motor, in connection with the control system which applies only half-voltage to the motor on the first two notches and full voltage on the last two notches, gives a perfect system of speed control with the least expenditure of energy and the smallest maximum discharge rate for the battery. If we consider the normal torque to be that obtained when the coils are connected two halves in multiple, we can obtain this torque with the field-coils connected all in series (thus giving double the turns in the field,) and with the field magnetic circuit unsaturated by an expenditure of current of about .7 of the normal current; but as the motor is not absolutely unsaturated it requires about .75 of the full-load current to give the full-load torque when the coils are all in series. It must be remembered that the speed will be decreased in proportion as the current is decreased, so that for the full-load torque the current required with the field-coils all in series will be only .75 of the normal current, and the speed will be approximately .75 of the normal speed. It will thus be seen that with the control system which I employ, in which the start is made on the first notch with no resistance in circuit but with the battery connected to give .5 voltage and with the field-coils all in series, a speed will be obtained which will be somewhat less than .25 of the normal speed of the vehicle. On the second notch, with the fields connected two halves in parallel and with the battery connected to give half-voltage, the speed will be approximately .5 of the normal. On the third notch, with the full battery voltage and with the motor-field coils connected all in series, the motor will run at approximately .75 of the normal speed, and on the last notch, with the full battery voltage operating and with the fields connected two halves in parallel, the motor will operate at its normal speed. I have thus provided a method of control which will always start the vehicle on the first notch, insure a smooth acceleration from notch to notch, provide four efficient running speeds, and keep the discharge rate of the battery down to a minimum. With this system of control it is impossible for the driver to discharge the battery at such an abnormal rate as with the ordinary method of control, which operates with a saturated-field motor and has only two running-notches.

In the accompanying drawings, Figure 1 is a diagram of a combination of a secondary battery, a motor, and a controller so designed and arranged as to practice my invention. Fig. 2 is a diagram of circuit connections for minimum speed of the motor. Fig. 3 is a similar diagram of circuit connections for an increased speed. Fig. 4 is a similar diagram of circuit connections for a still higher speed, and Fig. 5 is a similar diagram of circuit connections for maximum speed.

In the drawings the armature-winding 1 of the motor is at all times in series with its field-magnet winding, the latter being, however, so divided and arranged with reference to the controller that portions of it may be connected in parallel relation to each other. I have shown the field-magnet winding as comprising four coils 2, 3, 4, and 5 so combined with a controller 6 that they may all be connected in series or so that coils 2 and 3 may be connected in series with each other and as a set connected in parallel with coils 4 and 5, which are also in series with each other. For the purposes of my invention, as will be understood from the operation hereinafter described, the motor should be so designed that the magnetic circuits for the windings 2, 3, 4, and 5 shall be worked well below saturation. The source of energy for driving the motor is represented by a secondary battery 7, the cells of which are divided into two groups 8 and 9, the controller 6 being also so constructed and arranged with reference to the battery that the two groups of cells may be connected either in series or in parallel relation. Obviously the battery might be divided into a greater number of groups of cells, so as to provide a greater number of voltages, and the field-magnet windings of the motor might also be divided into a greater number of sections, so as to give greater variation of field strength, if desired. It is to be understood, therefore, that the invention is not limited as regards the number and variations of either field-magnet-winding sections or battery groups, and consequently it is not limited to any specific number of applied voltages or field strengths.

In the controller shown the fingers 10 and 11 are respectively connected to the terminals of the armature 1, the fingers 12 and 13 to the terminals of the field-magnet coil 5, the fingers 14 and 15 to the terminals of the field-magnet coil 4, the fingers 16 and 17 to the terminals of the field-magnet coil 3, the fingers 18 and 19 to the terminals of the field-magnet coil 2, the fingers 20 and 21 to the terminals of the group of cells 8, and the fingers 22 and 23 to the terminals of the group of cells 9.

It will be seen that when the drum 24 of the controller, which is shown as developed into a plane in Fig. 1, is rotated to bring the first set of contact-pieces into engagement with the corresponding fingers the groups of cells 8 and 9 will be connected in parallel relation and the field-magnet coils 2, 3, 4, and 5 will be connected in series with each other and with the armature 1, as indicated in Fig. 2, so that substantially one-half the normal battery voltage will be supplied to the motor, and on account of the series relation of the field-magnet coils there will be a maximum number of ampere-turns and a corresponding field strength, and the motor will run at a minimum speed and with a maximum torque.

When the drum is moved another step to bring the second line of contact-pieces into engagement with the fingers, the groups of cells 8 and 9 will remain, as before, connected in parallel; but coils 2 and 3, constituting one half of the field-magnet winding, will be connected in parallel with the other half of the winding represented by coils 4 and 5, thus reducing the ampere-turns, and consequently the field strength, and therefore at the same voltage as before, giving an increased motor speed. Movement of the drum another step to bring the third line of contact-pieces into engagement with the fingers will serve to connect all of the battery-cells in series and also the field-magnet coils in series, thus providing the full battery voltage with maximum field strength for the motor, this arrangement being such as to give a still further increase of motor speed. Further movement of the drum to bring the fourth line of contact-pieces into engagement with the fingers serves to connect the battery-cells is series, as before, and one half of the field-magnet winding represented by the coils 2 and 3 in parallel with the other half of the winding represented by coils 4 and 5, thus providing full battery voltage and reducing the field strength of the motor, whereby the maximum motor speed will be provided.

As has already been indicated, additional variations are possible, and the invention is not therefore limited to the specific combinations and manipulations shown, though for the operation of vehicle-motors by means of secondary batteries the number of speed variations shown will generally be found sufficient, and the provision of means for securing a greater number of speeds would produce such complications of controlling apparatus as would be likely to more than offset any advantage that might be gained by the greater speed variations.

I claim as my invention—

1. The method of operating a series-wound electric motor, having an unsaturated-field magnetic circuit, at varying speeds, which consists in supplying substantially one half voltage with the motor-field-magnet coils in series for minimum speed and maximum torque, connecting substantially one half of the field-magnet winding in parallel with the other half without change of voltage for the next higher speed, supplying full voltage with the field-coils in series for the next higher speed and connecting the two halves of the field-magnet winding without change of voltage for maximum speed.

2. The method of operating a series-wound electric motor, having an unsaturated-field magnetic circuit, from a secondary battery at varying speeds, which consists in connecting one half the battery-cells in parallel relation with the other half to the motor-field magnet winding in series, second, connecting one half the battery-cells in parallel relation with the other half to the two halves of the field-magnet winding in parallel, third, connecting the battery-cells in series with each other to the entire field-magnet winding in series, and, fourth, connecting the battery-cells in series with each other to the two halves of the field-magnet winding in parallel.

3. The method of effecting speed acceleration of an electric motor, having an unsaturated-field magnetic circuit, without undue expenditure of energy, which consists in first supplying such energy from a secondary battery having its cells connected in parallel to the motor-field magnet and armature coils in series, then connecting one half of the field-magnet coils in parallel with the other half, and then changing both the battery-cells and the field-magnet coils to series relation.

4. The method of operating an electric motor, having an unsaturated-field magnet, at different speeds by energy from a secondary battery without undue expenditure of such energy, which consists in connecting one half the battery-cells in parallel relation with the other half and the two halves of the motor-field-magnet winding successively in series and in parallel relation for two successive speeds and connecting the battery-cells in series and the two halves of the field-magnet winding successively in series and in parallel relation for two successive higher speeds.

5. The method of operating a series-wound electric motor, having an unsaturated-field magnet, at different speeds and with a minimum expenditure of energy, which consists in varying the electromotive force applied to the motor terminals and at the same time varying the field ampere-turns without adding or subtracting any magnetizing-winding.

6. The method of operating a series-wound electric motor, having an unsaturated-field magnetic circuit, at different speeds, which consists in applying a given electromotive force to the motor terminals with the field-magnet winding connected in series, then changing two substantially equal portions of said winding to parallel relation and then increasing the applied electromotive force.

7. The method of varying the speed of a series-wound electric motor having an unsaturated-field magnetic circuit, which consists in first supplying a minimum voltage with the field-magnet windings connected for maximum field strength, then changing the connections of said winding to reduce the field strength, then increasing both the applied voltage and the field strength and finally reducing the field strength without changing the applied voltage, all without adding or subtracting any magnetizing-winding.

8. The method of varying the speed of a series-wound electric motor having an unsaturated-field magnetic circuit, which consists in supplying a given voltage and varying the field ampere-turns of the motor without adding or subtracting any magnetizing-winding and then changing the voltage and varying the field ampere-turns under the new voltage in a similar manner.

In testimony whereof I have hereunto subscribed my name this 9th day of August, 1902.

NORMAN W. STORER.

Witnesses:
 GEO. V. MILLIGAN,
 J. C. MORSE.